(12) United States Patent
Shen et al.

(10) Patent No.: US 9,854,454 B2
(45) Date of Patent: Dec. 26, 2017

(54) MATCHING METHOD AND APPARATUS

(71) Applicant: Huawei Technologies Co., Ltd., Shenzhen (CN)

(72) Inventors: Jian Shen, Shenzhen (CN); Lixin Jiang, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 15/281,500

(22) Filed: Sep. 30, 2016

(65) Prior Publication Data

US 2017/0019801 A1    Jan. 19, 2017

Related U.S. Application Data

(63) Continuation of application No. PCT/CN2015/074624, filed on Mar. 19, 2015.

(30) Foreign Application Priority Data

Mar. 31, 2014    (CN) .......................... 2014 1 0127022

(51) Int. Cl.
*H04W 16/28* (2009.01)
*H04W 16/24* (2009.01)
*H04W 24/02* (2009.01)
*H01Q 3/02* (2006.01)
*H01Q 1/24* (2006.01)
(Continued)

(52) U.S. Cl.
CPC .............. *H04W 16/28* (2013.01); *H01Q 3/02* (2013.01); *H04W 16/24* (2013.01); *H04W 24/02* (2013.01); *H01Q 1/246* (2013.01); *H01Q 3/005* (2013.01); *H04W 88/085* (2013.01)

(58) Field of Classification Search
CPC .............................. H04W 16/28; H04W 24/02
See application file for complete search history.

(56) References Cited

U.S. PATENT DOCUMENTS

| 7,120,431 B1 * | 10/2006 | Huo ........................ H01Q 1/246 455/423 |
| 2006/0052065 A1 * | 3/2006 | Argaman ............. H04B 7/0667 455/101 |

(Continued)

FOREIGN PATENT DOCUMENTS

| CN | 101035328 A | 9/2007 |
| CN | 102780090 A | 11/2012 |

(Continued)

*Primary Examiner* — Tuan H Nguyen
(74) *Attorney, Agent, or Firm* — Slater Matsil, LLP

(57) ABSTRACT

Embodiments of the present application relate to a matching method. The method includes: selecting, by a base station, a remote electrical tilt unit and sending instruction information to a signal transmitter, where the instruction information is used to instruct the signal transmitter to connect to an antenna radio frequency port corresponding to the remote electrical tilt unit and enable the signal generator to generate a signal. The method also includes receiving, by the base station, the signal when the signal reaches the antenna radio frequency port through a signal coupling unit and is sent by using the antenna radio frequency port. The method also includes selecting, by the base station, a target sector according to a background noise value of each base-station radio frequency port.

9 Claims, 5 Drawing Sheets

(51) Int. Cl.
*H01Q 3/00* (2006.01)
*H04W 88/08* (2009.01)

(56) References Cited

U.S. PATENT DOCUMENTS

2012/0264459 A1  10/2012  Johansson et al.
2013/0127666 A1   5/2013  Zhang et al.

FOREIGN PATENT DOCUMENTS

| CN | 102802180 A  | 11/2012 |
| CN | 102833770 A  | 12/2012 |
| CN | 103874080 A  | 6/2014  |
| EP |   1962374 A1 | 8/2008  |
| WO | 2015039314 A1| 3/2015  |

* cited by examiner

MATCHING METHOD AND APPARATUS

CROSS-REFERENCE TO RELATED APPLICATIONS

This application is a continuation of International Application No. PCT/CN2015/074624, filed on Mar. 19, 2015, which claims priority to Chinese Patent Application No. 201410127022.4, filed on Mar. 31, 2014. The disclosures of the aforementioned applications are hereby incorporated by reference in their entireties.

TECHNICAL FIELD

The present application relates to the field of mobile communications, and in particular, to a matching method and apparatus.

BACKGROUND

In an activity for optimizing a wireless network that uses a remote electrical tilt antenna apparatus, network optimization engineers generally adjust downtilts of antennas of some sector objects to increase coverage of the sectors and improve network performance. However, when network optimization engineers in an operation and maintenance center want to adjust a downtilt of an antenna, they, facing multiple RET objects of a base station, do not know which RET object they need to operate, in order to adjust a target antenna they want to operate. FIG. 1 is a schematic diagram of a correspondence between sector objects and RET objects, where a remote radio unit (RRU) 1 corresponds to a remote control unit (RCU) 1, and an RRU 2 corresponds to an RCU 2. In the right side of the figure, because radio frequency (RF) cables are cross-installed, the RRU 1 corresponds to the RCU 2 and the RRU 2 corresponds to the RCU 1. A difference resulting from such an RF cable connection leads to a change in a control relationship of the RET objects. If the change cannot be identified correctly, a downtilt of a wrong antenna may be set, seriously affecting network quality.

In the prior art, sensors are added to radio frequency channels of antennas. When a base station controls radio frequency channels to transmit radio frequency signals successively, sensors are used to feed back, to a RCU in a remote electrical tilt antenna apparatus, whether there is a radio frequency signal transmitted on a radio frequency channel of an antenna, so that a correspondence between sector objects and RET objects can be determined. However, for a radio frequency channel that cannot transmit a radio frequency signal, the sensors cannot detect a radio frequency signal. Consequently, a correspondence between sector objects and RET objects cannot be determined.

SUMMARY

Embodiments of the present application provide a matching method and apparatus, which can accurately determine a correspondence between sector objects and RET objects by matching.

According to a first aspect, a matching method is provided. The method is applied to a remote electrical tilt antenna system, where the remote electrical tilt antenna system includes an antenna radio frequency port, a signal generator, and a remote electrical tilt unit, a signal coupling unit is disposed in the antenna radio frequency port, the signal generator is connected to the signal coupling unit, and any two of the signal generator, the remote electrical tilt unit or a base station remain in a communication connection with each other by using an AISG interface. The method includes: selecting, by the base station, a remote electrical tilt unit and sending instruction information to the signal transmitter, where the instruction information is used to instruct the signal transmitter to connect to an antenna radio frequency port corresponding to the remote electrical tilt unit and enable the signal generator to generate a signal. The method also includes receiving, by the base station, the signal when the signal reaches the antenna radio frequency port through the signal coupling unit and is sent by using the antenna radio frequency port. The method also includes selecting, by the base station, a target sector according to a background noise value of each base-station radio frequency port.

With reference to the first aspect, in a first implementation manner of the first aspect, the selecting, by the base station, a target sector according to a background noise value of each base-station radio frequency port includes: sending, by the base station, a calculation instruction to a remote radio unit RRU, where the calculation instruction is used to instruct the RRU to calculate a background noise value of a base-station radio frequency port corresponding to the RRU; and selecting, by the base station, an RRU corresponding to a base-station radio frequency port whose background noise value is increased as the target sector.

With reference to the first aspect or the first implementation manner of the first aspect, in a second implementation manner of the first aspect, before the sending, by the base station, instruction information to the signal generator, the method further includes: traversing, by the base station, all HDCL buses that are in communication with the remote electrical tilt unit, and sending scanning instruction information to the HDLC buses, so as to identify all remote electrical tilt units mounted on the HDLC buses.

With reference to the first aspect or the first implementation manner of the first aspect or the second implementation manner of the first aspect, in a third implementation manner of the first aspect, the sending instruction information to the signal transmitter, where the instruction information is used to instruct the signal transmitter to connect to an antenna radio frequency port corresponding to the remote electrical tilt unit and enable the signal generator to generate a signal includes: sending instruction information to the signal transmitter, where the instruction information is used to instruct the signal generator to connect to the antenna radio frequency port corresponding to the remote electrical tilt unit by using a multi-way gating switch, and to generate a signal by using a signal source.

According to a second aspect, a matching apparatus is provided. The apparatus is applied to a remote electrical tilt antenna system, where the remote electrical tilt antenna system includes an antenna radio frequency port, a signal generator, and a remote electrical tilt unit, a signal coupling unit is disposed in the antenna radio frequency port, and the signal generator is connected to the signal coupling unit. The apparatus includes: a processing unit, a receiving unit, a sending unit, and a selection unit. The processing unit is configured to select a remote electrical tilt unit and send instruction information to the signal transmitter, where the instruction information is used to instruct the signal transmitter to connect to an antenna radio frequency port corresponding to the remote electrical tilt unit and enable the signal generator to generate a signal. The receiving unit is configured to receive the signal generated by the processing unit. The selection unit is configured to select a target sector, according to a background noise value of each base-station radio frequency port.

With reference to the second aspect, in a first implementation manner of the second aspect, the selection unit is specifically configured to: send a calculation instruction to a remote radio unit RRU, where the calculation instruction is used to instruct the RRU to calculate a background noise value of a base-station radio frequency port corresponding to the RRU; and select an RRU corresponding to a base-station radio frequency port whose background noise value is increased as the target sector.

With reference to the second aspect or the first implementation manner of the second aspect, in a second implementation manner of the second aspect, the apparatus further includes: an identification unit, configured to traverse all HDLC buses that are in communication with the remote electrical tilt unit, and send scanning instruction information to the HDLC buses, so as to identify all remote electrical tilt units mounted on the HDLC buses.

With reference to the second aspect or the first implementation manner of the second aspect or the second implementation manner of the second aspect, in a third implementation manner of the second aspect, the processing unit is specifically configured to: send instruction information to the signal transmitter, where the instruction information is used to instruct the signal generator to connect to the antenna radio frequency port corresponding to the remote electrical tilt unit by using a multi-way gating switch, and to generate a signal by using a signal source.

By means of the matching method and apparatus provided in the embodiments of the present application, a correspondence between sector objects and RET objects can be accurately matched.

DETAILED DESCRIPTION OF ILLUSTRATIVE EMBODIMENTS

The following further describes the technical solutions of the present application in detail with reference to accompanying drawings and embodiments.

In the technical solutions provided in the present application, a base station first determines whether there is a sector object that has not been associated with an RET object, where sector objects refer to base stations having different frequencies, and may also be referred to as remote radio units RRUs; and the RET object refers to a remote electrical tilt unit and generally includes one or more remote control units RCUs. When there are multiple RCUs, the multiple RCUs are cascaded with one another. When there is a sector object that has not been associated with an RET object, the base station selects an RET object, that is, a remote electrical tilt unit, and sends instruction information to a signal transmitter. The instruction information is used to instruct the signal transmitter to connect to an antenna radio frequency port corresponding to the remote electrical tilt unit and enable the signal generator to generate a signal. The signal reaches the antenna radio frequency port through a signal coupling unit and reaches the base station through the antenna radio frequency port. After receiving the signal, the base station selects a target sector according to a background noise value of each base-station radio frequency port. In this way, an association relationship between sector objects and RET objects is established.

Figure 1:
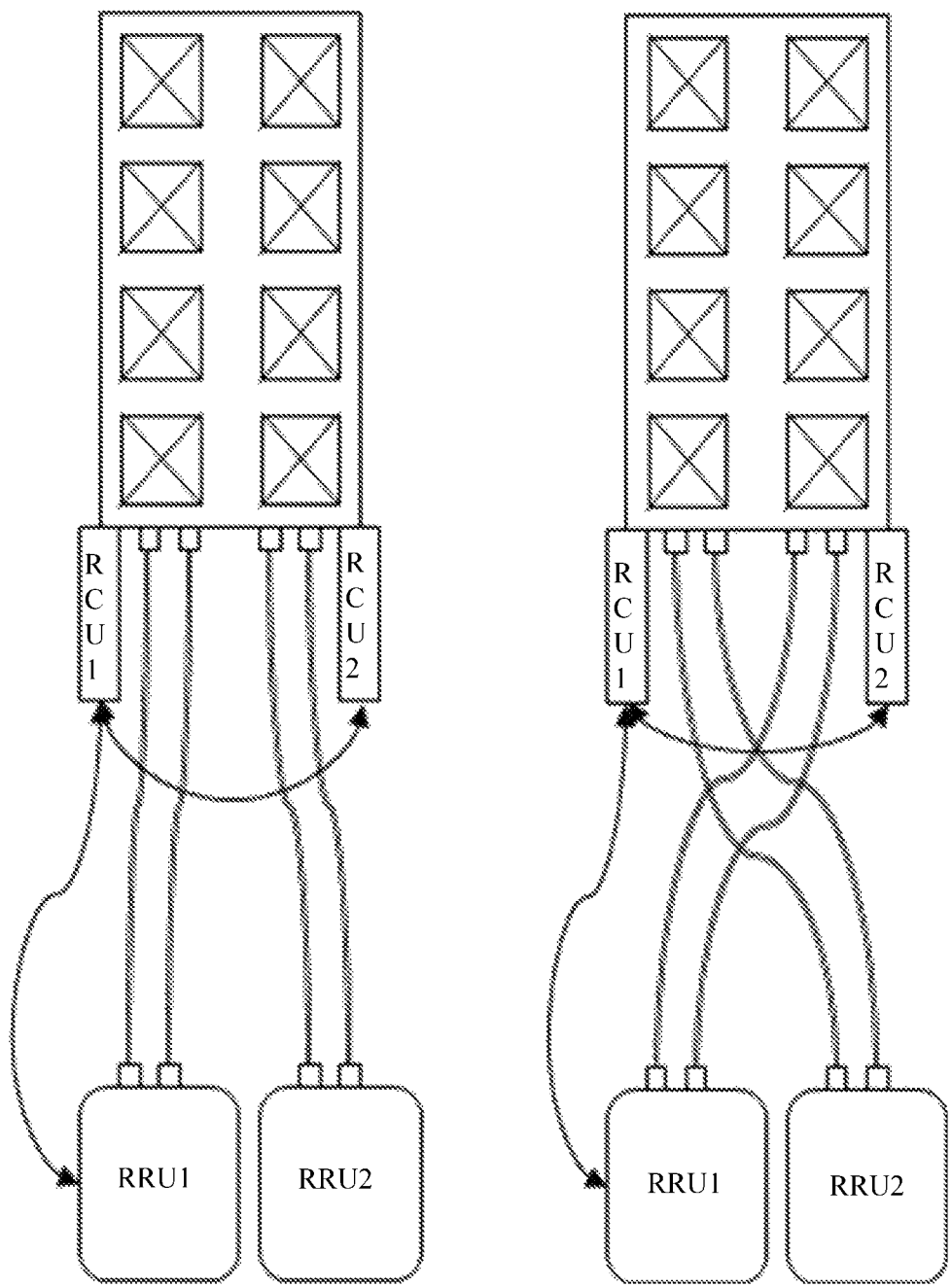
FIG. 1 is a schematic diagram of a correspondence between sector objects and RET objects.
Figure 2:
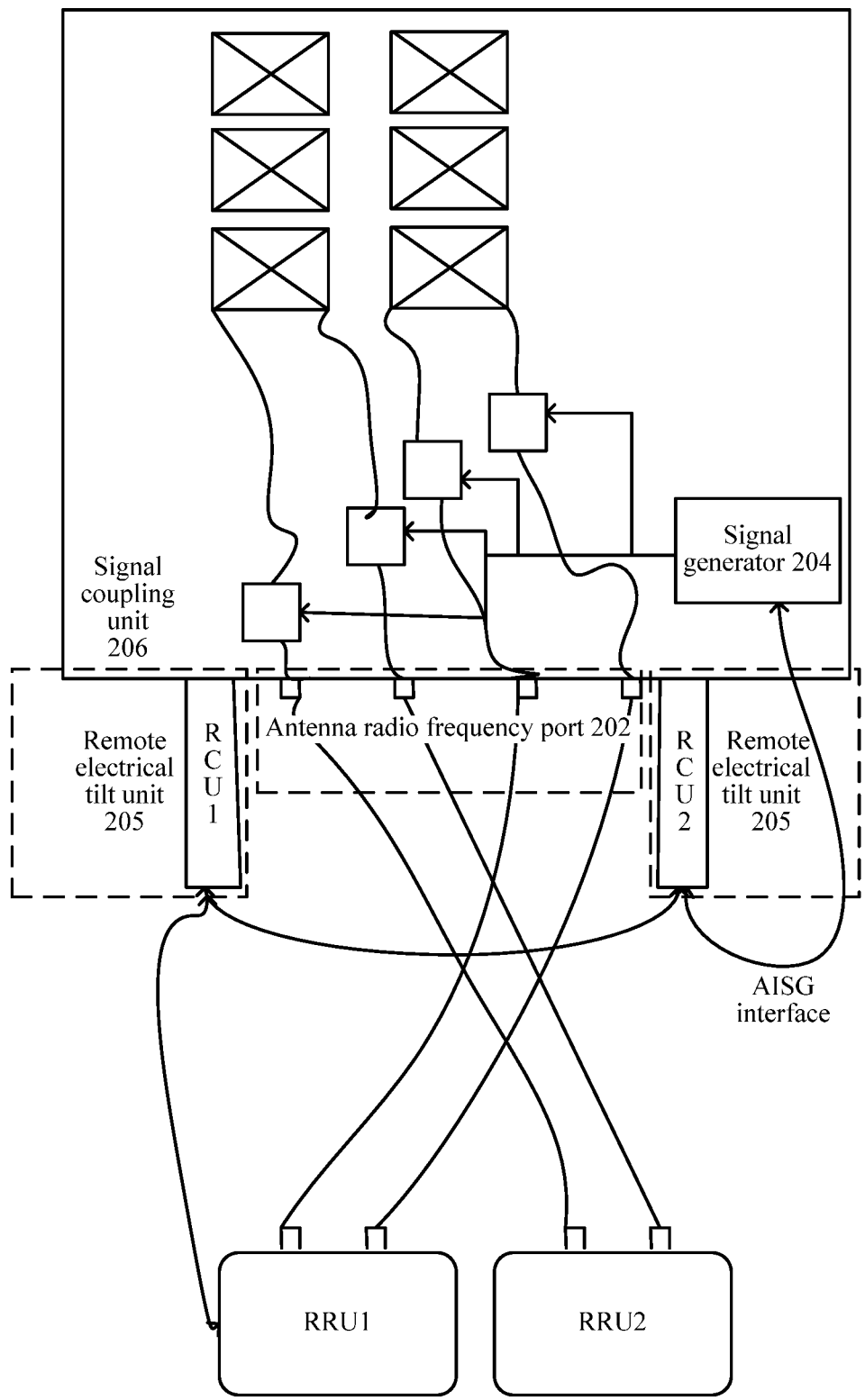
FIG. 2 shows a remote electrical tilt antenna system according to the present application.

It should be noted that a matching method provided in an embodiment of the present application is applied to a remote electrical tilt antenna system. Referring to a remote electrical tilt antenna system provided in the present application as shown in FIG. 2, the system includes an antenna unit array 201, an antenna radio frequency port 202, an antenna radio frequency channel 203, a signal generator 204, and a remote electrical tilt unit 205, where there are four antenna radio frequency ports 202, and a signal coupling unit 206 is disposed in each antenna radio frequency port 202. For example, the signal coupling unit 206 may be a coupler or a feeder apparatus such as a Bias Tee, and is configured to attach a signal generated by the signal generator 204 to the antenna radio frequency channel 203. Every two antenna radio frequency ports 202 form one pair and each pair of antenna radio frequency ports 202 is connected to the antenna unit array 201 by using a pair of antenna radio frequency channels 203, that is, the antenna radio frequency ports 202 correspond one-to-one to the antenna radio frequency channels 203. The signal generator 204 is disposed in the antenna radio frequency channel 203 and the signal generator 204 is connected to each signal coupling unit 206. The remote electrical tilt unit 205 includes two RCUs, namely, an RCU1 and an RCU2, where the RCU1 is connected to a corresponding RRU, the RCU2 is connected to the signal generator 204 by using an AISG interface, and the RCU1 is connected to the RCU2. In addition, the signal generator 204 remains in a communication connection with the remote electrical tilt unit 205 by using an AISG interface, and the signal generator 204 and the remote electrical tilt unit 205 separately remain in a communication connection with the base station by using an AISG interface.

Specifically, in FIG. 2, the signal generator 204 includes a signal source and a multi-way gating switch, where a multi-way selecting end of the multi-way gating switch is separately connected to the signal coupling units 206, and the other end of the multi-way gating switch is connected to the signal source.

It should be noted that the remote electrical tilt unit 205 is connected to the signal generator 204, and the signal generator 204 is connected to each signal coupling unit 206, so that a feedback channel between the antenna radio frequency channel 203 and the remote electrical tilt unit 205 is established, that is, a communication interface between the remote electrical tilt unit 205 and an antenna is established, so that the remote electrical tilt antenna system can notify the base station whether an antenna that is currently adjusted is an antenna that a user wants to adjust.

Figure 3:
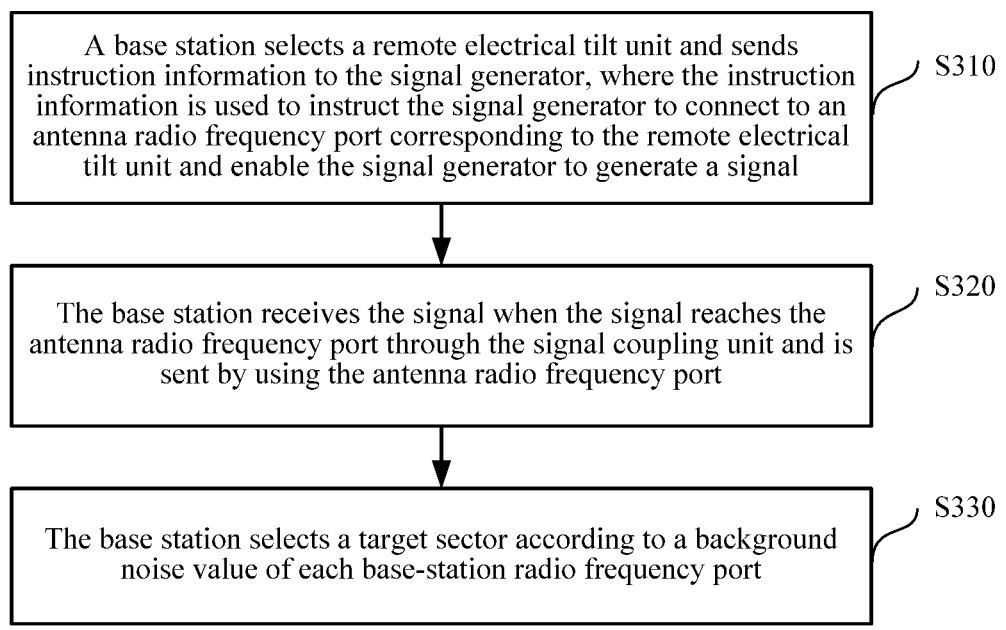
FIG. 3 is a flowchart of a matching method according to Embodiment 1 of the present application.

FIG. 3 is a flowchart of a matching method according to Embodiment 1 of the present application. The method is applied to the remote electrical tilt antenna system shown in FIG. 2. The method is executed by a base station. As shown in FIG. 3, the method specifically includes the following steps.

S310. A base station selects a remote electrical tilt unit and sends instruction information to the signal transmitter, where the instruction information is used to instruct the signal transmitter to connect to an antenna radio frequency port corresponding to the remote electrical tilt unit and enable the signal generator to generate a signal.

Referring to FIG. 2, the base station first performs corresponding configuration, including device configuration and service configuration. For example, a base-station radio frequency port corresponding to the RRU1 transmits radio frequency signals successively, and checks a status of each antenna radio frequency port 202, so as to determine a correspondence between each base-station radio frequency port and the antenna radio frequency port 202. Then, the base station scans and configures the remote electrical tilt unit 205. Specifically, the base station traverses all HDLC buses that are in communication with the remote electrical tilt unit 205 and sends scanning instruction information to the HDLC buses, so as to identify all remote electrical tilt units 205 mounted on the HDLC buses. Finally, the base station determines whether there is a sector object that has not been associated with an RET object, that is, determines whether there is an RRU that has not been associated with an RCU. When there is an RRU that has not been associated with an RCU, the base station selects an RCU, for example, the RCU1, and sends instruction information to the signal transmitter 204. The instruction information is used to instruct the signal generator 204 to connect to the antenna radio frequency port 202 corresponding to the RCU1 by using the multi-way gating switch, and generate a signal by using a signal source. As shown in FIG. 2, the signal generator 204 connects to a pair of antenna radio frequency ports 202 on the left corresponding to the RCU1 by using the multi-way gating switch.

S320. The base station receives the signal when the signal reaches the antenna radio frequency port through the signal coupling unit and is sent by using the antenna radio frequency port.

The signal generated by the signal source first reaches the signal coupling unit 206 connected to the gating switch, then reaches the antenna radio frequency port 202 through the signal coupling unit 206, and finally reaches the base station through the antenna radio frequency port 202.

S330. The base station selects a target sector according to a background noise value of each base-station radio frequency port.

Optionally, the base station sends a calculation instruction to a remote radio unit RRU, where the calculation instruction is used to instruct the RRU to calculate a background noise value of a base-station radio frequency port corresponding to the RRU; the base station selects an RRU corresponding to a base-station radio frequency port whose background noise value is increased as the target sector. Specifically, the base station sends a calculation instruction to the RRU1 and the RRU2. After receiving the calculation instruction, the RRU1 and the RRU2 calculate background noise values of base-station radio frequency ports corresponding to the RRU1 and the RRU2. After a preset time delay, the base station determines that the background noise value of the base-station radio frequency port corresponding to the RRU2 is increased, and therefore the base station selects the RRU2 as a target sector, that is, the RCU1 corresponds to the RCU2. In this way, an association relationship between sector objects and RET objects is established.

Therefore, according to the matching method provided in this embodiment of the present application, a feedback channel is established between the antenna radio frequency channel 203 and the remote electrical tilt unit 205, that is, a communication interface between the remote electrical tilt unit 205 and an antenna is established, so that a correspondence between sector objects and RET objects can be matched accurately.

Figure 4:
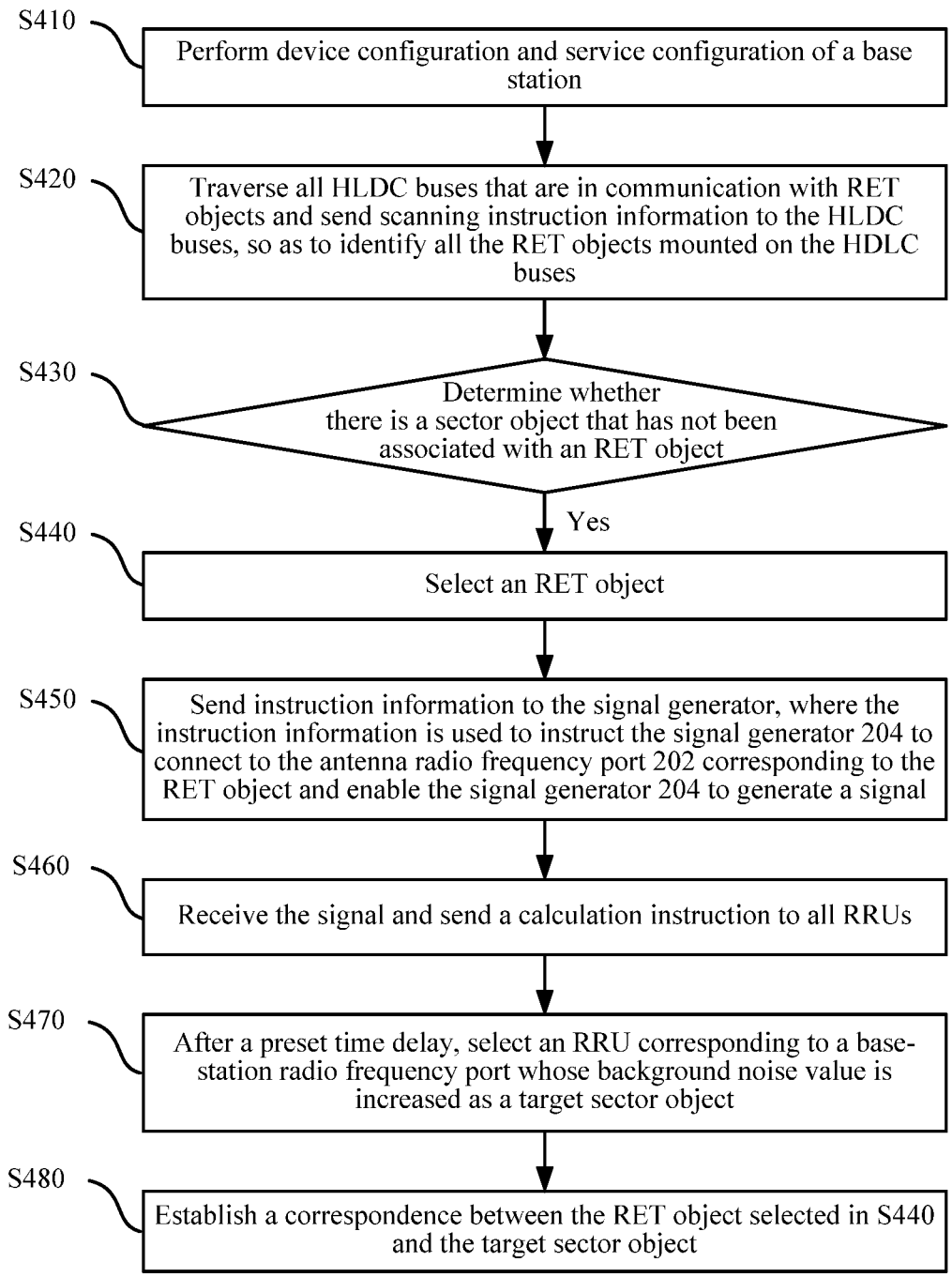
FIG. 4 is a flowchart of a matching method according to Embodiment 2 of the present application.

FIG. 4 is a flowchart of a matching method according to Embodiment 2 of the present application. The method is applied to a remote electrical tilt antenna system shown in FIG. 2. The method is executed by a base station. As shown in FIG. 4, the method specifically includes the following steps.

S410. Perform device configuration and service configuration of a base station.

It should be noted that the device configuration and the service configuration of the base station belong to the prior art, and details are not described herein.

S420. Traverse all HDLC buses that are in communication with RET objects and send scanning instruction information to the HDLC buses, so as to identify all the RET objects mounted on the HDLC buses.

Herein, after performing scanning, the base station automatically creates and configures RET objects.

S430. Determine whether there is a sector object that has not been associated with an RET object; if yes, execute S440; otherwise, the process ends.

S440. Select an RET object.

S450. Send instruction information to the signal generator, where the instruction information is used to instruct the signal generator 204 to connect to the antenna radio frequency port 202 corresponding to the RET object and enable the signal generator 204 to generate a signal. It should be noted that the signal generated by the signal generator 204 first reaches the signal coupling unit 206 connected to the gating switch, then reaches the antenna radio frequency port 202 through the signal coupling unit 206, and finally reaches the base station through the antenna radio frequency port 202.

S460. Receive the signal and send a calculation instruction to all RRUs.

In FIG. 2, after receiving the calculation instruction, the RRU1 and the RRU2 calculate background noise values of the base-station radio frequency ports corresponding to the RRU1 and the RRU2.

S470. After a preset time delay, select an RRU corresponding to a base-station radio frequency port whose background noise value is increased as the target sector object.

S480. Establish a correspondence between the RET object selected in S440 and the target sector object.

Figure 5:
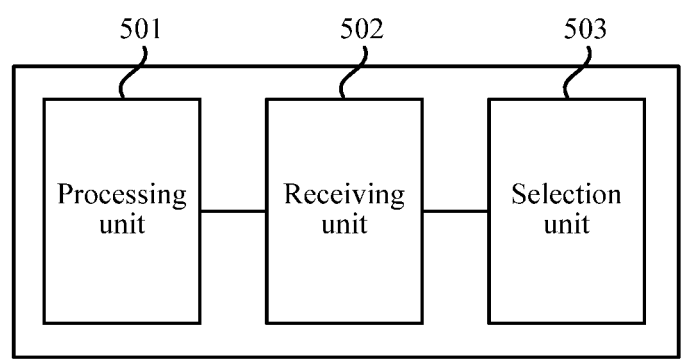
FIG. 5 is a schematic diagram of a matching apparatus according to Embodiment 3 of the present application.

FIG. 5 is a schematic diagram of a matching apparatus according to Embodiment 3 of the present application. The apparatus can be used to execute the method described in FIG. 3. The apparatus is applied to a remote electrical tilt antenna system, where the remote electrical tilt antenna system includes an antenna radio frequency port 202, a signal generator 204, and a remote electrical tilt unit 205, a signal coupling unit 206 is disposed in the antenna radio frequency port 202, and the signal generator 204 is connected to the signal coupling unit 206. The apparatus includes: a processing unit 501, a receiving unit 502, and a selection unit 503.

The processing unit 501 is configured to select a remote electrical tilt unit 205 and send instruction information to the signal transmitter 204, where the instruction information is used to instruct the signal transmitter 204 to connect to an antenna radio frequency port 202 corresponding to the remote electrical tilt unit 205 and enable the signal generator 204 to generate a signal.

The processing unit 501 is specifically configured to: send instruction information to the signal transmitter 204, where the instruction information is used to instruct the signal generator 204 to connect to the antenna radio frequency port 202 corresponding to the remote electrical tilt unit 205 by using a multi-way gating switch, and to generate a signal by using a signal source.

The receiving unit 502 is configured to receive the signal generated by the processing unit 501.

The selection unit is configured to select a target sector according to a background noise value of each base-station radio frequency port.

Optionally, the selection unit 503 is specifically configured to: send a calculation instruction to a remote radio unit RRU, where the calculation instruction is used to instruct the RRU to calculate a background noise value of a base-station radio frequency port corresponding to the RRU; and select an RRU corresponding to a base-station radio frequency port whose background noise value is increased as the target sector.

Optionally, the apparatus further includes: an identification unit 504, configured to traverse all HDLC buses that are in communication with the remote electrical tilt unit 205, and send scanning instruction information to the HDLC buses, so as to identify all remote electrical tilt units mounted on the HDLC buses.

Because the method provided in Embodiment 1 of the present application is implanted in the apparatus provided in Embodiment 3 of the present application, no further details are provided for a specific working process of the apparatus provide by the present application.

Therefore, according to the matching method and apparatus that are provided in this embodiment of the present application, a feedback channel is established between the antenna radio frequency channel 203 and the remote electrical tilt unit 205, that is, a communication interface between the remote electrical tilt unit 205 and an antenna is established, so that a correspondence between sector objects and RET objects can be matched accurately.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

Steps of methods or algorithms described in the embodiments disclosed in this specification may be implemented by hardware, a software module executed by a processor, or a combination thereof. The software module may be configured in a random access memory (RAM), a memory, a read-only memory (ROM), an electrically programmable ROM, an electrically erasable programmable ROM, a register, a hard disk, a removable disk, a CD-ROM, or a storage medium in any other forms well-known in the art.

In the foregoing specific implementation manners, the objective, technical solutions, and benefits of the present application are further described in detail. It should be understood that the foregoing descriptions are merely specific implementation manners of the present application, but are not intended to limit the protection scope of the present application. Any modification, equivalent replacement, or improvement made without departing from the spirit and principle of the present application should fall within the protection scope of the present application.

What is claimed is:

1. A method, wherein the method is applied to a remote electrical tilt antenna system, the remote electrical tilt antenna system comprises an antenna radio frequency port, a signal generator, and a remote electrical tilt unit, a signal coupling unit is disposed in the antenna radio frequency port, the signal generator is connected to the signal coupling unit, and any two of the signal generator, the remote electrical tilt unit and a base station remain in a communication connection with each other using an antenna interface standards group (AISG) interface, and the method comprises:

selecting, by the base station, the remote electrical tilt unit and sending instruction information to the signal generator, wherein the instruction information instructs the signal generator to connect to an antenna radio frequency port corresponding to the remote electrical tilt unit and enable the signal generator to generate a signal;

receiving, by the base station, the signal when the signal reaches the antenna radio frequency port through the signal coupling unit and is sent using the antenna radio frequency port; and selecting, by the base station, a target sector according to a background noise value of each base station radio frequency port, wherein selecting the target sector according to a background noise value of each base station radio frequency port comprises:

sending, by the base station, a calculation instruction to a remote radio unit (RRU), wherein the calculation instruction instructs the RRU to calculate a background noise value of a base station radio frequency port corresponding to the RRU; and selecting, by the base station, an RRU corresponding to a base station radio frequency port whose background noise value is increased as the target sector.

2. The method according to claim 1, wherein before sending the instruction information to the signal generator, the method further comprises:

traversing, by the base station, all high-level data link control (HDLC) buses that are in communication with the remote electrical tilt unit, and sending scanning instruction information to the HDLC buses, so as to identify all remote electrical tilt units mounted on the HDLC buses.

3. The method according to claim 1, wherein sending the instruction information to the signal generator, wherein the instruction information instructs the signal generator to connect to the antenna radio frequency port corresponding to the remote electrical tilt unit and enable the signal generator to generate a signal, comprises:

sending instruction information to the signal generator, wherein the instruction information instructs the signal generator to connect to the antenna radio frequency port corresponding to the remote electrical tilt unit using a multi-way gating switch, and to generate a signal using a signal source.

4. An apparatus, comprising:

a processor; and a transmitter;

wherein the apparatus is applied to a remote electrical tilt antenna system;

wherein the remote electrical tilt antenna system comprises an antenna radio frequency port, a signal generator, a remote electrical tilt unit, and a signal coupling unit disposed in the antenna radio frequency port, wherein the signal generator is connected to the signal coupling unit;

wherein the processor is configured to traverse all high-level data link control (HDLC) buses that are in communication with the remote electrical tilt unit, and send scanning instruction information to the HDLC buses, so as to identify all remote electrical tilt units mounted on the HDLC buses;

wherein the processor is configured to select a remote electrical tilt unit and send instruction information to the signal generator, wherein the instruction information instructs the signal generator to connect to an antenna radio frequency port corresponding to the remote electrical tilt unit and enable the signal generator to generate a signal;

wherein the transmitter is configured to receive the signal generated by the processor; and wherein the processor is configured to select a target sector according to a background noise value of each base-station radio frequency port.

5. The apparatus according to claim 4, wherein the processor is further configured to:
send a calculation instruction to a remote radio unit (RRU), wherein the calculation instruction instructs the RRU to calculate a background noise value of a base-station radio frequency port corresponding to the RRU; and
select an RRU corresponding to a base-station radio frequency port whose background noise value is increased as the target sector.

6. The apparatus according to claim 4, wherein the processor is further configured to:
send instruction information to the signal generator, wherein the instruction information instructs the signal generator to connect to the antenna radio frequency port corresponding to the remote electrical tilt unit using a multi-way gating switch, and to generate a signal by using a signal source.

7. An apparatus, comprising:
a processor; and
a transmitter;
wherein the apparatus is applied to a remote electrical tilt antenna system;

wherein the remote electrical tilt antenna system comprises an antenna radio frequency port, a signal generator, a remote electrical tilt unit, and a signal coupling unit disposed in the antenna radio frequency port, wherein the signal generator is connected to the signal coupling unit;

wherein the processor is configured to select a remote electrical tilt unit and send instruction information to the signal generator, wherein the instruction information instructs the signal generator to connect to an antenna radio frequency port corresponding to the remote electrical tilt unit and enable the signal generator to generate a signal;

wherein the transmitter is configured to receive the signal generated by the processor; and wherein the processor is configured to select a target sector according to a background noise value of each base-station radio frequency port;

wherein the processor is further configured to:
send a calculation instruction to a remote radio unit (RRU), wherein the calculation instruction instructs the RRU to calculate a background noise value of a base-station radio frequency port corresponding to the RRU; and
select an RRU corresponding to a base-station radio frequency port whose background noise value is increased as the target sector.

8. The apparatus according to claim 7, wherein the processor is further configured to:
send instruction information to the signal generator, wherein the instruction information instructs the signal generator to connect to the antenna radio frequency port corresponding to the remote electrical tilt unit using a multi-way gating switch, and to generate a signal by using a signal source.

9. The apparatus according to claim 7, wherein the processor is configured to traverse all high-level data link control (HDLC) buses that are in communication with the remote electrical tilt unit, and send scanning instruction information to the HDLC buses, so as to identify all remote electrical tilt units mounted on the HDLC buses.

* * * * *